United States Patent [19]

Barden

[11] 4,230,089
[45] Oct. 28, 1980

[54] SUPPORT ASSEMBLY FOR COOKING UTENSILS

[76] Inventor: Allan D. Barden, R.R. 32, Box 467, Terre Haute, Ind. 47803

[21] Appl. No.: 947,414

[22] Filed: Oct. 2, 1978

[51] Int. Cl.$^3$ .............................................. F24B 3/00
[52] U.S. Cl. ..................................................... 126/30
[58] Field of Search .................... 126/30, 25; 403/104, 403/105

[56] References Cited

U.S. PATENT DOCUMENTS

| | | | |
|---|---|---|---|
| 1,505,220 | 8/1924 | Shay | 403/104 |
| 1,845,143 | 2/1932 | Friesner | 403/105 |
| 1,846,427 | 2/1932 | Kuhrt | 403/104 |
| 2,664,884 | 7/1952 | Walker | 126/30 |
| 2,940,439 | 6/1960 | Bartels et al. | 126/30 |
| 2,974,662 | 3/1961 | Forrest | 126/30 |
| 2,998,001 | 8/1961 | Lofgren et al. | 126/25 |
| 3,067,734 | 12/1962 | Lucas | 126/30 |
| 3,095,869 | 7/1963 | Swenson | 126/25 |
| 3,199,818 | 8/1965 | Ahara | 403/104 |
| 3,344,780 | 10/1967 | Anderson | 126/30 |
| 4,083,354 | 4/1978 | Claire et al. | 126/30 |

Primary Examiner—Samuel Scott
Assistant Examiner—Wesley S. Ratliff, Jr.
Attorney, Agent, or Firm—Woodard, Weikart, Emhardt & Naughton

[57] ABSTRACT

Disclosed is a support assembly for a campfire cooking utensil in which a horizontal arm may be adjustably positioned along a vertical support member by means of spaced, notch gripping apertures in plates carried by the arm. An adapter member releasably joins the free end of the arm and a cooking implement which is rigidly attached to the adapter. Inwardly directed flanges on the free end of the arm extend into longitudinal slots in the adapter and, adjacent the open, entry end of the slots, abutments are provided. The width of the slots and the abutment height are sized so that the adapter and the arm are locked against separation when the adapter is cocked slightly, under load, with relation to the arm.

7 Claims, 10 Drawing Figures

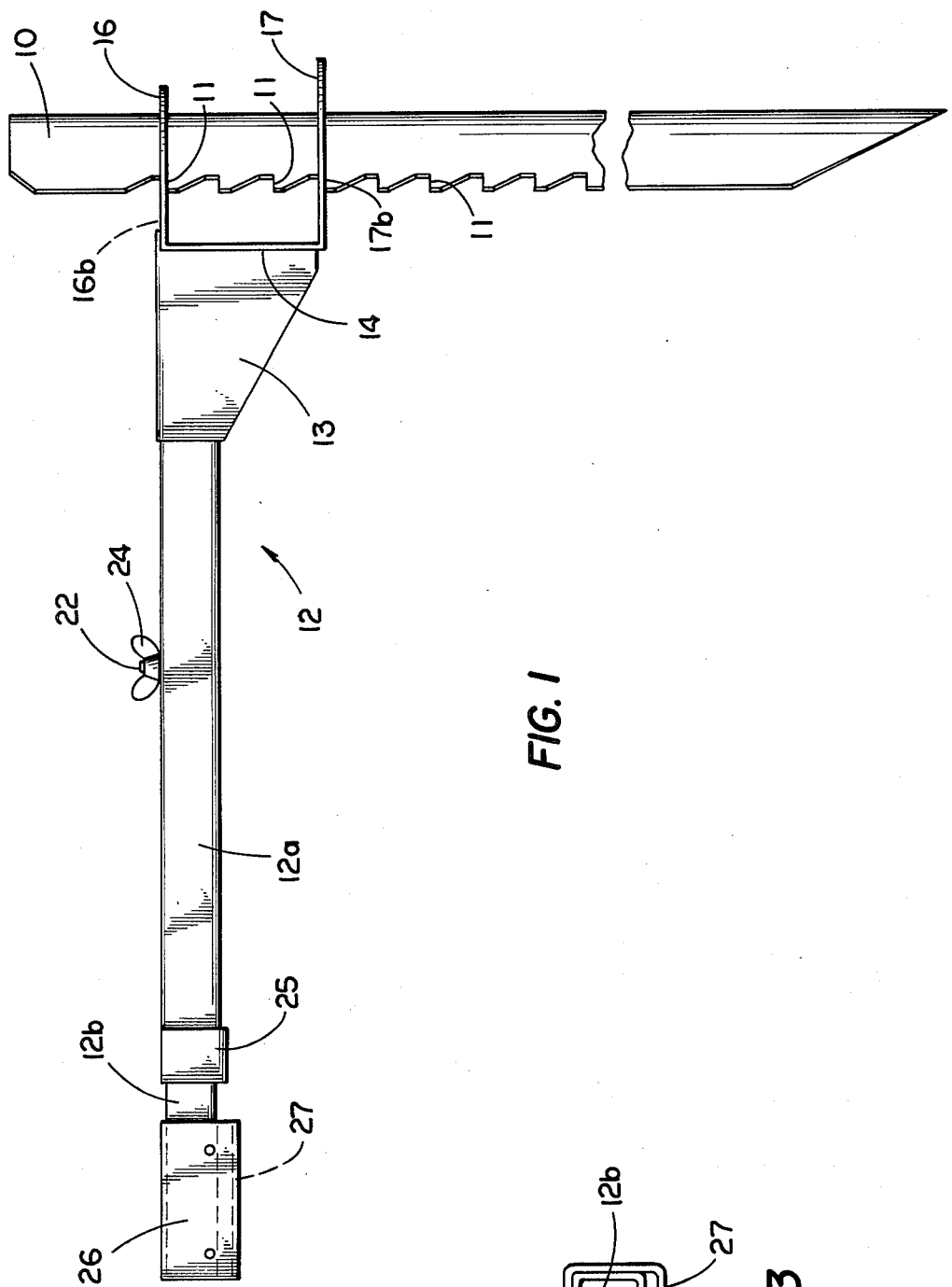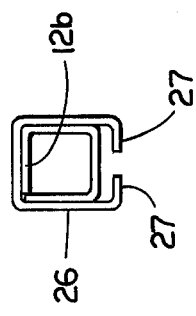

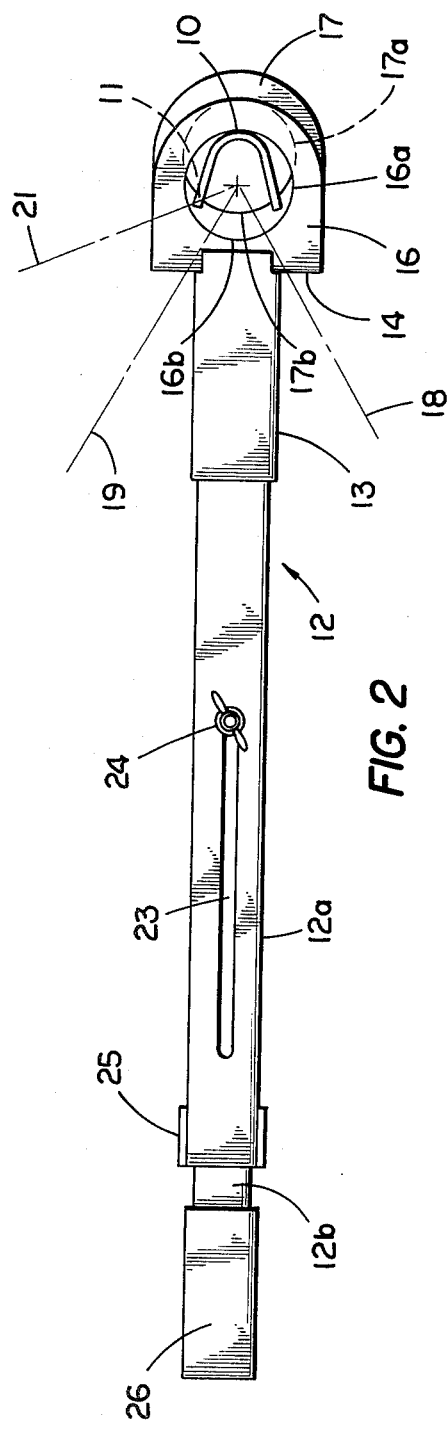
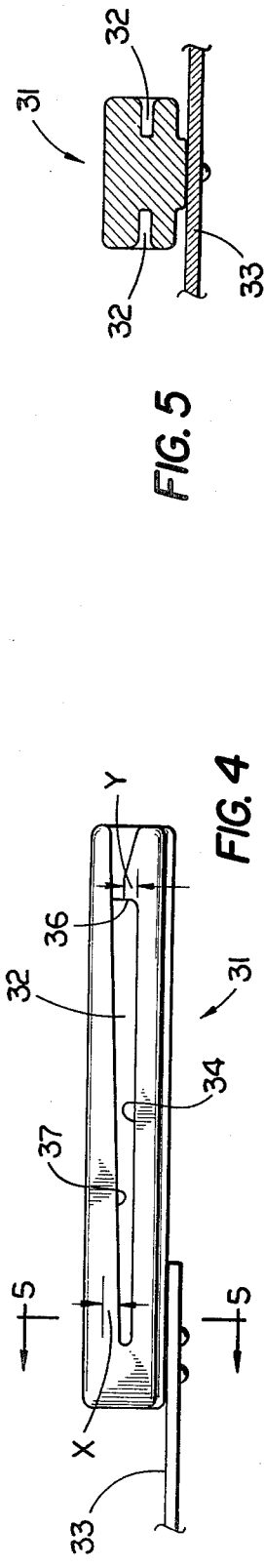
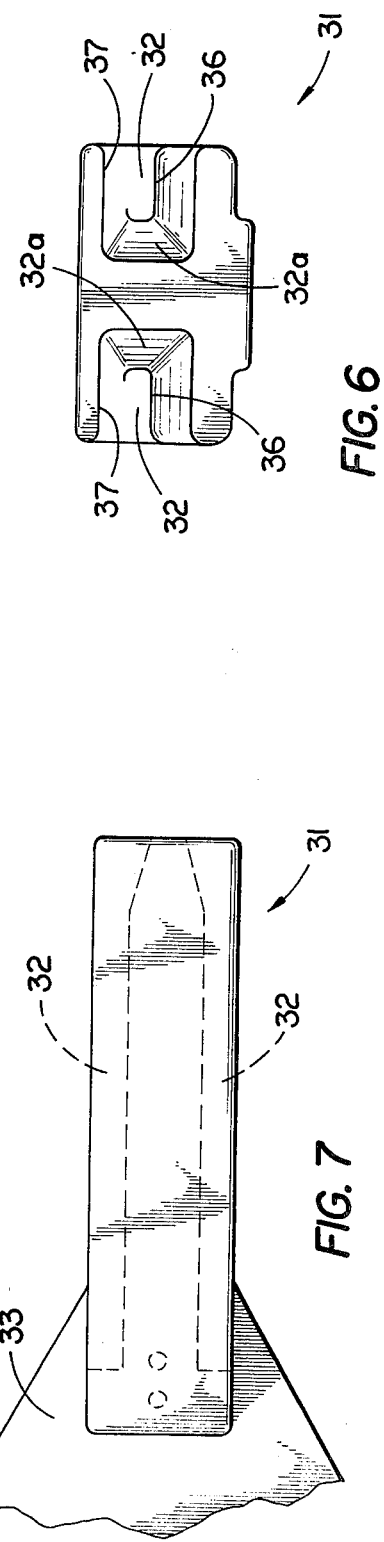
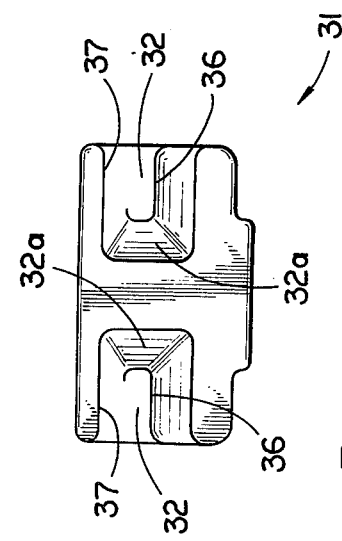
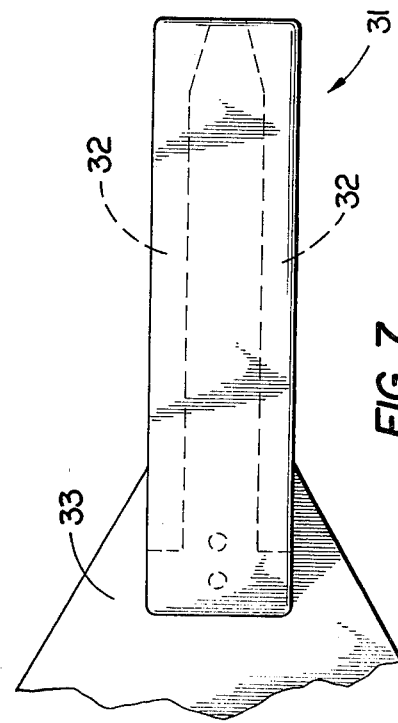
FIG. 2
FIG. 5
FIG. 6
FIG. 4
FIG. 7

SUPPORT ASSEMBLY FOR COOKING UTENSILS

BACKGROUND OF THE INVENTION

Various forms of support assemblies for campfire cooking utensils are known in the prior art. Conventionally these utilize an arm extending laterally from a vertical support member. The free end of the arm has a cooking implement attached to it and the arm can swing in a horizontal plane to position or remove the arm and implement into or away from the campfire. The device of the present invention represents an improvement over these prior art devices in respect to the adjustable attachment of the arm to the support member and the attachment of a cooking implement to the free end of the arm. Prior art U.S. Pats. disclosing apparatus of the type discussed above include: Nos. 2,604,884; 2,940,439; 2,974,662; 2,998,001; 3,067,734; 3,095,869; 3,344,780 and 4,083,354.

A low-cost, rugged, trouble-free attachment for the arm is formed by apertures in two spaced plates carried by the arm. These apertures are positioned so that, with the arm slightly cocked with relation to the plate, it may be moved along the length of the notched vertical support member and, when at the chosen height, can be moved to horizontal position locking the apertured plates in the notches. The arm, when so positioned, rigidly holds the cooking implement over the campfire, however, the arm can swing, in a horizontal plane, away from the fire.

The attachment adapter, secured to a grill, griddle, skillet or the like, is slotted to receive inwardly turned flanges carried at the free end of the arm and the slots are shaped so that gravity alone locks the flanges in the slots. Tilting the axis of the adapter and its attached implement slightly with relation to the axis of the arm releases the adapter. The notched vertical support member is pointed, at its lower end, to permit it to be driven into the ground. Where this is impractical, over ice or shield rock, for example, an auxiliary support foot is provided. The foot includes a socket receiving the somewhat tapered, pointed end of the vertical support member. A portion of the foot extends diametrically across the base of the socket to retain the tip of the support member out of forcible engagement with the underlying hard surface.

BRIEF DESCRIPTION OF THE DRAWINGS

FIG. 1 is a side view of the support components of an assembly embodying the present invention.

FIG. 2 is a top plan view of the structure shown in FIG. 1.

FIG. 3 is an end view of the telescoping arm components shown in FIGS. 1 and 2.

FIG. 4 is a side view of the adapter component of the assembly.

FIG. 5 is a sectional view taken generally along the line 5—5 of FIG. 4.

FIG. 6 is an end view of the adapter component taken from the right hand end of the component as viewed in FIG. 4.

FIG. 7 is a top plan view of the structure shown in FIG. 3.

DESCRIPTION OF THE PREFERRED EMBODIMENT

Figure 8:
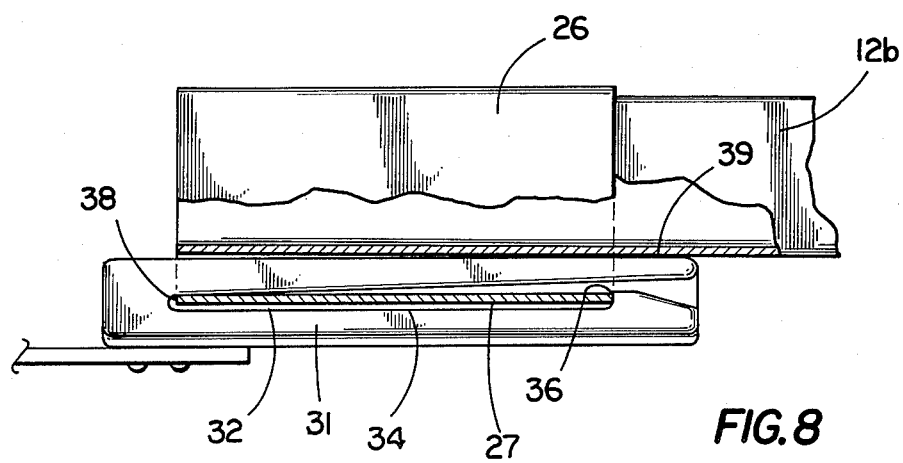
FIG. 8 is a view similar to FIG. 4 but showing the adapter in place on the supporting arm portion of the support structure.

Referring initially to FIGS. 1 and 2, the assembly includes a vertical member 10 having a pointed lower end permitting it to be driven into the ground. The member 10 is generally U-shaped in cross-section as may best be seen in FIG. 2 and both free edges or side margins along the shank of the member are provided with aligned detent notches 11 of predetermined depth.

A horizontal arm 12 extends from the member 10 and, at one end, is welded or otherwise rigidly secured to a gusset member 13 which, in turn has rigidly secured to it the member 14. The member 14 is formed to provide spaced horizontal plates 16 and 17 having apertures 16a and 17a, respectively therein which receive the vertical member 10. The corresponding aperture margins (identified at 16b and 17b in FIGS. 1 and 2), nearest the arm 12, are horizontally spaced a distance substantially equal to the depth of the detent notches 11 on the vertical member 10. When the arm 12 is perpendicular to member 10, the margin of aperture 16a in plate 16 engages the curved, rear surface of member 10 and the margin 17b of aperture 17a in plate 17 engages or is positioned close to the root depth surface of the appropriate detent notch 11. The arm is thus braced in horizontal position but when the arm is tilted to align the centers of apertures 16a and 17a with the vertical, longitudinal axis of member 10, the apertures will freely receive the member 10 and the spaced plates 16 and 17, with attached arm 10, may slide along the member 10 until the arm is situated at the desired height. Returning the arm to the perpendicular with relation to member 10 causes the plate 17 to enter the appropriate detent notch 11 bracing the arm as shown in FIG. 2. The arm may be pivotally moved out of overlying relation to the source of heat as indicated by broken lines 18, 19 and 21 in FIG. 2. As this pivotal movement takes place, assuming it to be counterclockwise as viewed in FIG. 2, because of the relative position of the centers of apertures 16a and 17a, the adjacent aperture margin in plate 17 moves out of the detent notch 11 it previously occupied and the aperture margin in plate 16 moves into that detent notch 11 adjacent to plate 16. The arm is thus solidly braced or held in perpendicular relation to member 10 in any selected pivotal position of the arm. Because a detent notch must be accessible for entry by both plate 16 and 17 as the arm is pivotally moved, it will be understood that the space between the apertured plates 16 and 17 must be a whole integer (three, as shown in FIG. 1) multiple of the distance between adjacent detent notches 11 on the member 10.

The arm 12 is formed by two telescoping portions 12a and 12b. Portion 12a has a downwardly opening channel configuration, having a U-shaped bracket 25 at its free end (the other end of portion 12a being rigidly secured to gusset member 13). Arm portion 12b is rectangular in configuration and telescopes within the portion 12a. The relative positions of portions 12a and 12b, and, thus, the effective length of arm 12, is adjusted by means of the threaded stud 22 extending from the upper surface of portion 12b and through a longitudinal slot 23 (FIG. 2) in arm portion 12a. The stud receives the wing nut 24 which, when tightened, clamps the arm components rigidly together.

The free end of arm component 12b has rigidly secured to it, by welding or any other suitable means, a generally channel-shaped member 26 having opposed, inturned flanges 27 (FIG. 3). The member 26 and, particularly its inturned flanges cooperate with an adapter member 31 (FIGS. 4-8).

Referring to FIG. 4, the latching block or adapter member has the configuration of an elongated block having dead-ended, longitudinal slots 32 in opposite side faces. Rigidly secured to the base 31a of the adapter is a cooking utensil such as a pan, skillet or the like, but here shown to be a flat griddle or grill fragmentarily shown at 33. The slots 32 are widened at 32a(FIG. 6) to facilitate entry of the flanges 27 of the member 26. The lower margin of the slots is formed by a rectilinear portion 34 which is parallel to the central, longitudinal axis of the adapter, this portion 34 terminating at an upwardly extending abutment 36 having its height indicated at Y in FIG. 4. The upper margin 37 of the slots 32 is inclined with relation to the central, longitudinal axis of the adapter, the inclination or slope of the margin 37 being indicated at X in FIG. 4.

The gravity locking action of the adapter slots and the flanges 27 will be apparent from FIG. 8. When the flanges 27 are fully inserted into the slots 32, the rear margin of the flanges will fall below the top of abutment 36. The weight of the grill 33 will tend to pull the upper margin 37 of the slots into engagement with the end of the flanges 27 and the outer surface of the adapter 31 into engagement with the adjacent lower wall of member 12b, these engagement areas being indicated at 38 and 39, respectively, in FIG. 8. Since the dimension X in FIG. 4 is slightly greater than the dimension Y in FIG. 4, the rear edge of flange 27 cannot clear the abutment 36 when the adapter is in its position of FIG. 8 with relation to the arm component 12b. The adapter and the utensil carried by it are thus locked on the arm by the weight of the grill and adapter. This locking action can be conveniently released merely by setting the grill on a support surface and tilting the arm slightly to raise the flange end above abutment 36. The arm can then be separated from the adapter by sliding the arm rightwardly, as viewed in FIG. 8 to remove flanges 27 from slots 32.

Figure 9:
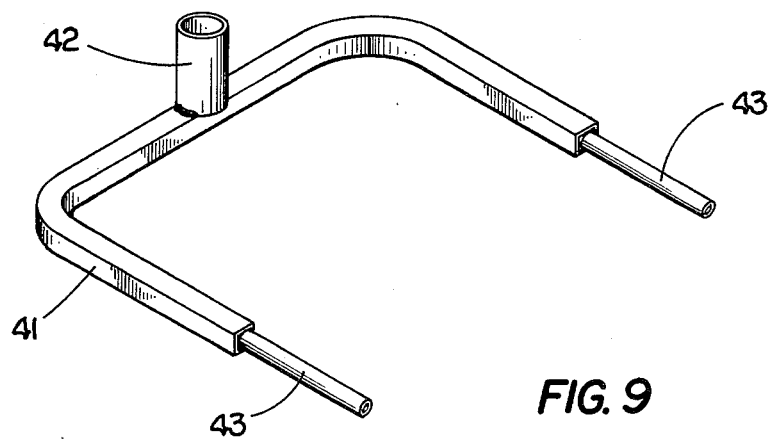
FIG. 9 is a perspective view of an alternate form of supporting foot for the assembly.
Figure 10:
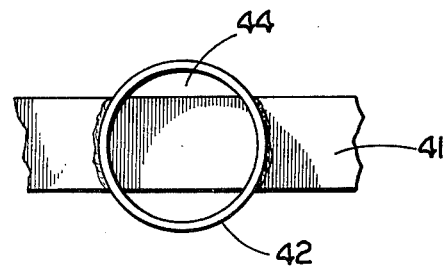
FIG. 10 is a fragmentary top plan view of a portion of the structure shown in FIG. 8.

An additional foot structure, for use where rocky soil or the support surface are such that the member 10 cannot be driven into the ground, is shown in FIGS. 9 and 10. This structure includes a U-shaped member 41 to which is welded an upwardly extending tubular socket 42, the member 41 extending diametrically across the open, lower end of the socket as shown in FIG. 10. The member 41 is tubular and square in cross sectional configuration. Round tubular members 43 are slidably received in the open ends of the member 41 and may be extended or retracted as necessary to provide a suitably stable support for the structure. The socket 42 is sized so as to freely receive the member 10, with the space between the side margin of the member 41 and the inner surface of the socket, this space being indicated at 44 in FIG. 10, being such as to receive the pointed tip portion of the member 10 and thus bracing it against rotation in the socket 42 and preventing substantial extension of the pointed end of member 10 into the underlying supporting surface.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A support assembly for utensils utilized in cooking food over a source of heat such as a campfire or the like, said assembly including a vertical elongated member generally U-shaped in cross-section having a central longitudinal axis and having a series of horizontally aligned detent notches formed in the vertical side margins of the member, a horizontal arm having at its free end attaching means for detachably securing a cooking utensil to the arm, said arm at its other end being adjustably joined to said vertical member by two vertically spaced horizontal plates attached to said arm and each of said plates having a circular aperture therethrough sized to closely accomodate said vertical member, the corresponding aperture margins nearest said arm being horizontally spaced a distance substantially equal to the depth of the detent notches on said vertical member, whereby tilting the arm to align the centers of said apertures with the central longitudinal axis of said vertical member permits said vertical member to extend through said apertures and said spaced plates with attached arm to slide along said vertical member and to seat in selected ones of said notches when said arm is positioned substantially normal to said vertical member and alternate ones of said vertically spaced horizontal plates enter said notches as said arm is pivoted through 180° in a horizontal plane about said vertical members.

2. A support assembly as claimed in claim 1 in which the lower end of said vertical member is pointed and thus adapted to be driven into the underlying ground to support the assembly adjacent a campfire.

3. A support assembly as claimed in claim 2 which includes a further component in the form of an enlarged base carrying a vertically disposed socket adapted to receive the pointed lower end of said vertical member and provided with a stop preventing insertion of said pointed lower end into the underlying ground.

4. A support assembly as claimed in claim 1 in which said arm is provided at its free end with opposed inturned flanges, said assembly further including an adaptor member rigidly attached to a cooking implement, said adaptor member having longitudinal dead-ended slots in its opposite side faces to receive said inturned flanges on said arm, at least one of said slots having the lower margin of its access end defined by an upwardly extending abutment adapted to engage the inturned flange edge remote from the free end of said arm to lock the adapter member on the arm.

5. A support assembly as claimed in claim 4 in which both of said slots are defined at their access ends by an upwardly extending abutment for locking the adaptor member on the arm.

6. A support assembly as claimed in claim 5 in which the upper longitudinal margin of each of said slots is inclined downwardly from the open access end of the slot to the closed end of the slot an amount greater than the height of said abutment to assure that said inturned flanges cannot clear the corresponding abutments when the flanges are engaging the upper margin of said slots adjacent the closed end of the slots.

7. A support assembly as claimed in claim 6 in which the open access ends of each of said slots are widened adjacent said abutments to facilitate entry of said inturned flanges into the slots.

* * * * *